J. W. AYLSWORTH.
PHONOGRAPH RECORD COMPOSITION.
APPLICATION FILED NOV. 7, 1906. RENEWED OCT. 12, 1908.
920,245.
Patented May 4, 1909.
Witnesses:
Frank D. Lewis
Anna R. Klehm
Inventor:
Jonas W. Aylsworth
by Frank L. Dyer
Atty.

UNITED STATES PATENT OFFICE.

JONAS W. AYLSWORTH, OF EAST ORANGE, NEW JERSEY, ASSIGNOR TO NEW JERSEY PATENT COMPANY, OF WEST ORANGE, NEW JERSEY, A CORPORATION OF NEW JERSEY.

PHONOGRAPH-RECORD COMPOSITION.

No. 920,245.  Specification of Letters Patent.  Patented May 4, 1909.

Application filed November 7, 1906, Serial No. 342,317. Renewed October 12, 1908. Serial No. 457,343.

*To all whom it may concern:*

Be it known that I, JONAS W. AYLSWORTH, a citizen of the United States, residing at 223 Midland avenue, East Orange, county of Essex, and State of New Jersey, have invented certain new and useful Improvements in Phonograph-Record Composition, of which the following is a description.

My invention relates to an improved composition for duplicate phonograph records, and my object is to provide a composition for the purpose, which is cheap, extremely durable, smooth, tough, and of very superior wearing qualities.

Although my improved composition is much cheaper than compositions now used in the art, it is equally as smooth, so that the reproduction is as free from scratching and foreign noises, while at the same time the material is so very hard and tough that the reproducers may be provided with heavier weights, stiffer diaphragms, and with greater leverage between the styluses and diaphragms than is now possible, so as to secure louder and better reproduction; or, on the other hand, the records may be formed with grooves of finer pitch, necessitating a smaller reproducing stylus, so as to increase the length of the reproduction. My composition, in fact, is so hard and durable that a record made therefrom having a pitch of 200 threads per inch, and engaged by a reproducing stylus of about one-fourth the diameter now used, will be substantially as durable as compositions at present in use with phonographs having 100 threads per inch. In my improved composition, I make use of a relatively large percentage of asphalt, which is a very cheap and hard material. I am aware that asphalt has been previously suggested as an ingredient in these compositions, but owing to its very slight coefficient of expansion and its sticky nature while hot, it has never been satisfactorily used. I find that a very superior composition can be made by combining asphalt with stearate of lead, and preferably a resin gum, such as copal, kauri, or colophony. A resin gum is desirable in the composition, as it tends to correct any crystallization which might exist in the stearate of lead, and also adds to the tough and durable qualities of the composition. If the attempt is made to produce a composition in which asphalt is mixed with stearate of soda, which latter is a very common ingredient in the art, a homogeneous compound can not be produced, but a mixture of asphalt and stearate of lead is entirely homogeneous and possesses the desirable qualities indicated.

My improved composition is designed especially for use in the manufacture of duplicate sound records by a process in which the material is distributed over the bore of a rapidly rotating mold by centrifugal force, as I disclose in application for Letters Patent of the United States, filed May 11, 1906, Serial No. 316,250.

As an example of a convenient process for manufacturing my improved composition, the following operations may be performed: 400 lbs. of commercial stearic acid, preferably having no more than 5% oleic acid, and free from uncombined fats and glycerin, is added to 200 lbs. of resin gum (such as copal, kauri or colophony) and melted at a temperature from 250 to 400 degrees F. When the stearic acid and the gum are thoroughly melted I then add 100 lbs. of litharge or oxid of lead, which results in the formation of stearate of lead with possible traces of free stearic acid, and possibly some resin acid salts of lead. The reaction results in the generation of water, which is driven off as steam. After the formation of the stearate of lead, I now add a suitable proportion of a hard asphalt, such as gilsonite, Egyptian or Syrian asphalt, the amount depending on the qualities desired in the ultimate product. With the amount of stearic acid indicated, from 100 to 400 lbs. of asphalt may be introduced. I do not consider it desirable to add more than 400 lbs. of asphalt, because in that case, the material is likely to become too viscid, and can be molded only with great difficulty unless very high temperatures are used, and which are apt to injure the molds. After the introduction of the asphalt, a temperature of about 400 degrees F. is maintained until all products of decomposition have been driven off, and the material has become entirely limpid and quiescent. The composition is now carefully filtered, preferably through several layers of muslin and is then ready for use, or if desired, the stearic acid and asphalt may be mixed and filtered before the litharge is added, practically all the impurities being in the two first mentioned ingredients.

In order that the invention may be better understood, attention is directed to the accompanying drawing, in which I illustrate a duplicate phonograph record, composed of my preferred composition.

While I have referred to the use of stearic acid throughout the above description, it will of course be evident that its common and well known equivalent, palmitic acid, may be substituted therefor without changing the characteristics of the composition, or its mode of manufacture. As a matter of fact, ordinary commercial stearic acid, of sufficient purity for my purpose, contains generally about fifty per cent. of palmitic acid.

Having now described my invention, what I claim as new and desire to secure by Letters Patent, is as follows:

1. An improved composition for sound records, comprising a mixture of asphalt, and a metallic stearate, substantially as and for the purposes set forth.

2. An improved composition for sound records, comprising a mixture of asphalt and stearate of lead, substantially as set forth.

3. An improved composition for sound records, comprising a mixture of asphalt, a metallic stearate and a resin gum, substantially as set forth.

4. An improved composition for sound records, comprising a mixture of asphalt, stearate of lead, and a resin gum, substantially as set forth.

5. An improved composition for sound records, comprising a mixture of asphalt, a metallic stearate and copal gum, substantially as set forth.

6. An improved composition for sound records, comprising a mixture of asphalt, stearate of lead, and copal gum, substantially as set forth.

This specification signed and witnessed this 3rd day of November 1906.

JONAS W. AYLSWORTH.

Witnesses:
FRANK L. DYER,
ANNA R. KLEHM.